UNITED STATES PATENT OFFICE.

ZACHARIE ROUSSIN AND DANIEL AUGUSTE ROSENSTIEHL, OF PARIS, FRANCE, ASSIGNORS TO THE SOCIÉTÉ ANONYME DES MATIERES COLORANTES ET PRODUITS CHIMIQUES DE ST. DENIS.

MANUFACTURE OF YELLOW AND ORANGE COLORING-MATTERS.

SPECIFICATION forming part of Letters Patent No. 297,852, dated April 29, 1884.

Application filed November 30, 1883. (No specimens.)

*To all whom it may concern:*

Be it known that we, ZACHARIE ROUSSIN and DANIEL AUGUSTE ROSENSTIEHL, both citizens of the French Republic, residing in Paris, France, have invented or discovered a certain new and useful Improvement in the Manufacture of Yellow and Orange Coloring-Matters, of which improvement the following specification is a full, clear, and exact description.

The invention relates more particularly to azoic coloring-matters; and it consists in the production of a new class of such coloring-matters or dye-stuffs. The majority of the azoic coloring-matters used in the arts owe their solubility to the presence of the radical of sulphuric acid. We have discovered that on replacing the group $SO_3H$ with the radical of carbonic acid ($CO_2H$) a certain number of these coloring-matters possess solubility sufficient to permit their industrial employment.

The following process is or may be adopted in the preparation of the new colors or dye-stuffs: A solution of twenty (20) kilograms of paramidobenzoate of soda in five hundred (500) liters of water is mixed in a cold state with a solution containing eight kilograms and six hundred grams (8K 600) of pure nitrite of soda and nineteen (19) kilograms of sulpuric acid at sixty-six degrees Baumé, (66° B.) Paradiazobenzoic acid forms, and to it is added an aqueous solution of thirteen (13) kilograms of resorcine. Saturation with an appropriate base (soda or ammonia) is effected. The coloring-matter forms in this neutral or slightly-alkaline medium. It dissolves in the water, and is or may be separated by acidifying the liquid. It is thus obtained in the state of an acid insoluble in water. It is collected, washed, dried, and saturated by ammonia or by carbonate of ammonia.

By this process the following colors have been obtained, to wit: first, matters dyeing textile fiber yellow by the action of diazometabenzoic acid, diazoparabenzoic acid, diazoorthocinnamic acid, diazoparacinnamic acid, diazophtalic acid, diazoorthobenzoic acid, or diazodiphenic acid upon phenol, resorcin diphenylamine, methyl and ethyl diphenylamine, dimethylaniline, diethylaniline, or dibenzylaniline; second, matters dyeing shades ranging from orange to red by the action of the acids above named upon naphtholalpha, naphtholbeta, or naphthylaminealpha.

The essential, new, and distinctive feature of this process is the substitution of amidocarboxylated acids—such as amidobenzoic acid ($C_6H_4NH_2CO_2H$)—for the corresponding sulphonic acid $C_6H_4NH_2SO_3H$ in the production of azoic coloring-matters in the state of free acid. In this state the matters are insoluble in water; but their alkaline salts are sufficiently soluble for practical purposes.

We claim—

1. In the production of azoic coloring-matters, the substitution of the radical of carbonic acid for that of sulphuric acid, substantially as described.

2. The azoic coloring-matters described, the same being characterized by the presence of the radical of carbonic acid in place of the sulphuric-acid radical heretofore present in such matters, substantially as set forth.

3. The improvement in the preparation of coloring-matters varying from yellow to orange, and even red, consisting in substituting the amidocarboxylated acids—such as amidobenzoic acid ($C_6H_4NH_2CO_2H$)—for the corresponding sulpho acids—such as the sulpho acid $C_6H_4NH_2SO_3H$—in the manufacture of azoic coloring-matters in the state of free acid, these coloring-matters being insoluble in water, but their alkaline salts being sufficiently soluble for practical purposes, substantially as described.

In witness whereof we have hereunto signed our names in the presence of two subscribing witnesses.

ZACHARIE ROUSSIN.
DANIEL AUGUSTE ROSENSTIEHL.

Witnesses:
ROBT. M. HOOPER,
AMAND RITTER.